United States Patent

[11] 3,625,291

[72] Inventors John R. Paulk
 Pine Needle Road, Fitzgerald, Ga. 31750;
 Jacob W. Paulk, Route #1, Wray, Ga. 31798
[21] Appl. No. 42,722
[22] Filed June 2, 1970
[45] Patented Dec. 7, 1971

[54] PEANUT-HARVESTING MACHINE
 15 Claims, 8 Drawing Figs.
[52] U.S. Cl. .................................................. 171/101
[51] Int. Cl. ................................................ A01d 29/00
[50] Field of Search .................................... 171/101, 61, 62, 44

[56] References Cited
UNITED STATES PATENTS

| | | | |
|---|---|---|---|
| 2,669,820 | 2/1954 | Falkner | 171/62 |
| 2,722,794 | 11/1955 | McGee | 171/101 |
| 3,454,100 | 7/1969 | Lilley | 171/101 |
| 2,997,114 | 8/1961 | Hines | 171/101 |

Primary Examiner—Antonio F. Guida
Attorney—Clarence A. O'Brien & Harvey B. Jacobson ABSTRACT: Peanut plants having taproots cut below the soil surface are transported upwardly by a conveyor in a harvesting machine to a location from which the plants are deposited onto the ground. Conical roller devices and guide rods invert the plants as they are discharged from the conveyor to windrow the plants with the taproots exposed.

John R. Paulk
Jacob W. Paulk
INVENTORS

John R. Paulk
Jacob W. Paulk
INVENTORS

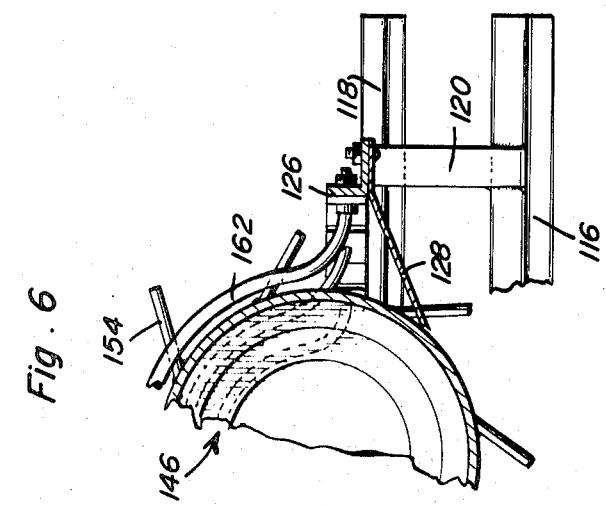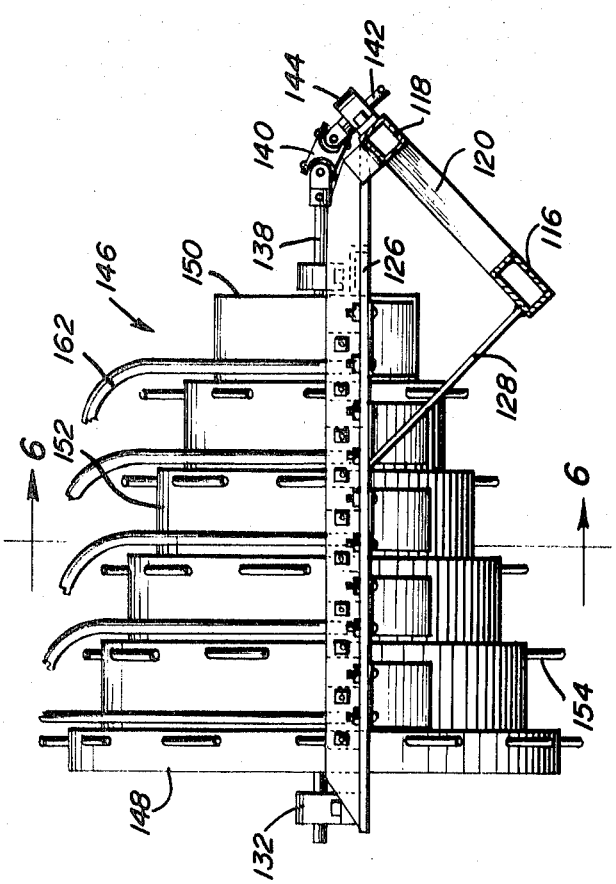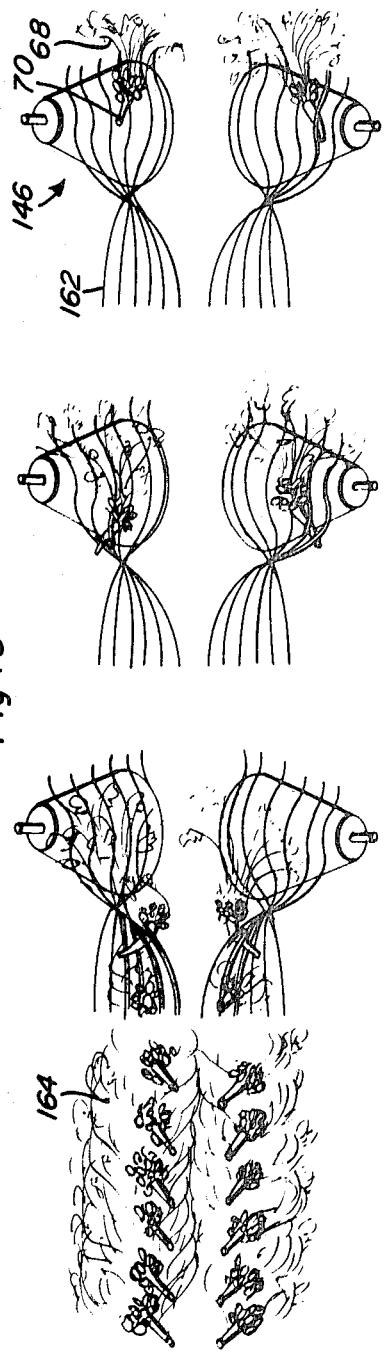
John R. Paulk
Jacob W. Paulk
INVENTORS

PEANUT-HARVESTING MACHINE

This invention relates generally to peanut harvesting machines and more particularly to a harvester in which the peanut plants are positively inverted to a position with the taproots exposed as they are deposited on the ground in a windrow in trailing relation to the machine.

Peanut-harvesting machines generally involve a machine frame that is towed forwardly over rows of vinelike peanut plants to sequentially cut the plants at the roots below the soil surface, and transfer the cut plants to the lower end of a conveyor by means of which the plants are transported upwardly and rearwardly of the machine to a discharge location from which the plants are deposited onto the ground in trailing relation to the forwardly moving harvesting machine.

Harvesting machines of this type are disclosed for example in U.S. Pat. No. 2,620,616. In windrowing the cut plants, it is desirable that the taproots be exposed to the air for drying. An attempt to windrow the plants in such a manner as to expose the roots for drying has been proposed in U.S. Pat. No. 2,620,616 employing a laterally deflecting chute attached to the harvester frame. This arrangement however is not very reliable or completely effective for the purposes. It is therefore an important object of the present invention to provide a peanut-harvesting machine having facilities for positively inverting the plants as they are discharged from the upper end of the conveyor in order to insure that the taproots of the plants when windrowed will be exposed to the air for drying. An additional object is to provide facilities for positively transferring plants discharged from the conveyor of the harvester to the ground in order to avoid return of clinging plants along its lower return run.

In accordance with the present invention, a pair of conical roller devices are operatively mounted by the harvester frame for rotation about laterally inclined axes located in rearward spaced relation below the discharge end of the harvester conveyor in order to engage the vinelike peanut plants as they reach the discharge end of the conveyor and positively transfer the plants to the ground. The angular relationship of the plant-engaging rollers is such as to cause the vine tips of the plants to be displaced laterally outwardly while at the same time the taproots of the plants are pushed between curved guide rods that extend over and rearwardly beyond the rollers. Some of the taproot portions of the plants are accordingly displaced laterally inwardly causing the plants to be inverted as they are transferred to the ground by rotation of the rollers resulting in a windrow of plants with the taproots exposed to the air for drying. The disposition of the conical rollers is such that the spacing between the underside of the conveyor adjacent the discharge end and the larger and smaller diameter ends of the rollers are approximately equidistant so as to ensure that all of the vines are removed from the conveyor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a partial sectional view taken substantially through a plane indicated by section line 5—5 in FIG. 4.

FIG. 6 is a partial sectional view taken substantially through a plane indicated by section line 6—6 in FIG. 5.

FIG. 7 is an enlarged partial sectional view taken substantially through a plane indicated by section line 7—7 in FIG. 1.

FIG. 8 is a series of diagrammatic, top plan views showing the plant inverting action associated with the harvesting machine of the present invention.

Figure 1:
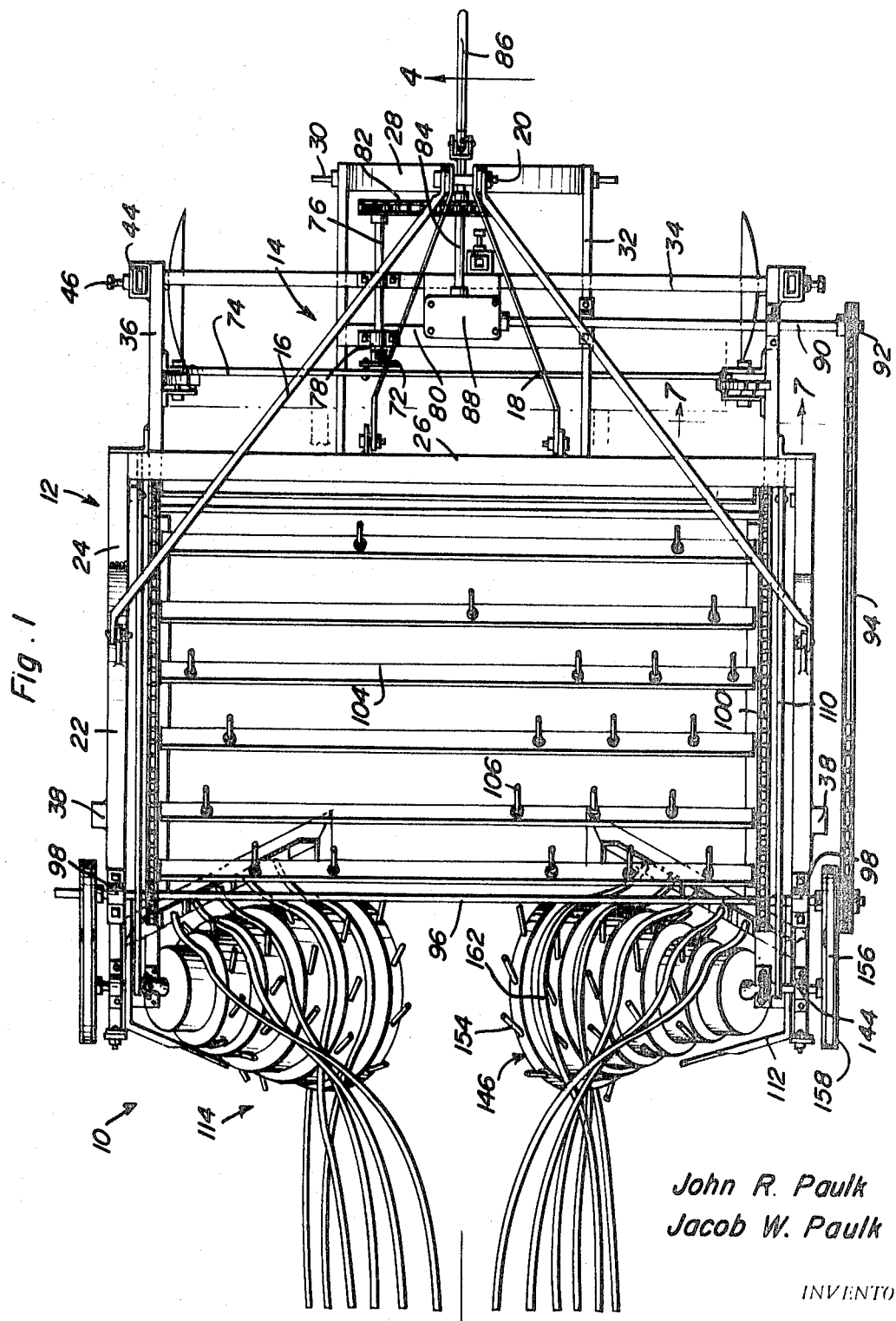
FIG. 1 is a top plan view of the peanut-harvesting machine constructed in accordance with the present invention.
Figure 2:
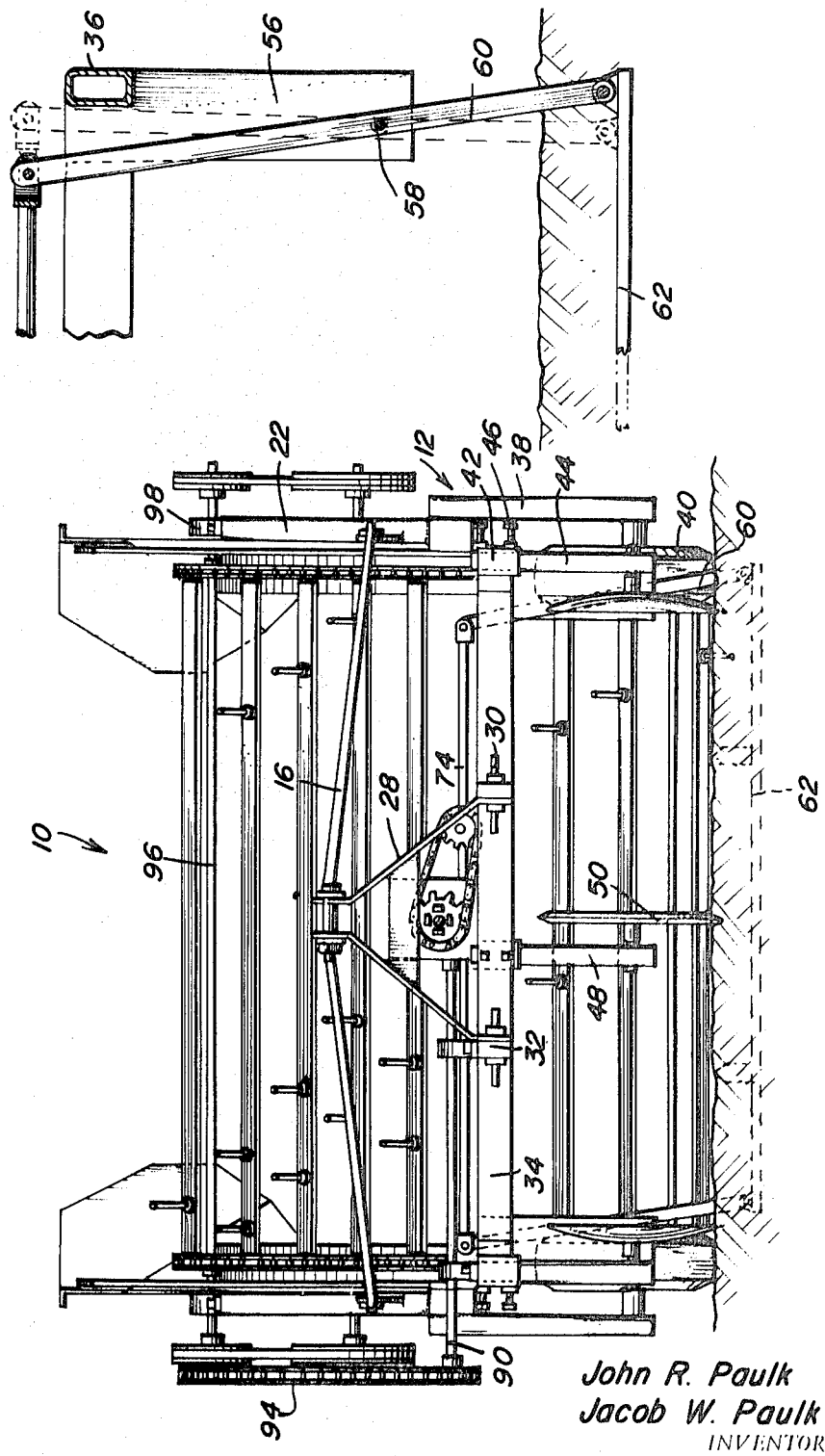
FIG. 2 is a front elevational view of the harvesting machine shown in FIG. 1.
Figure 3:
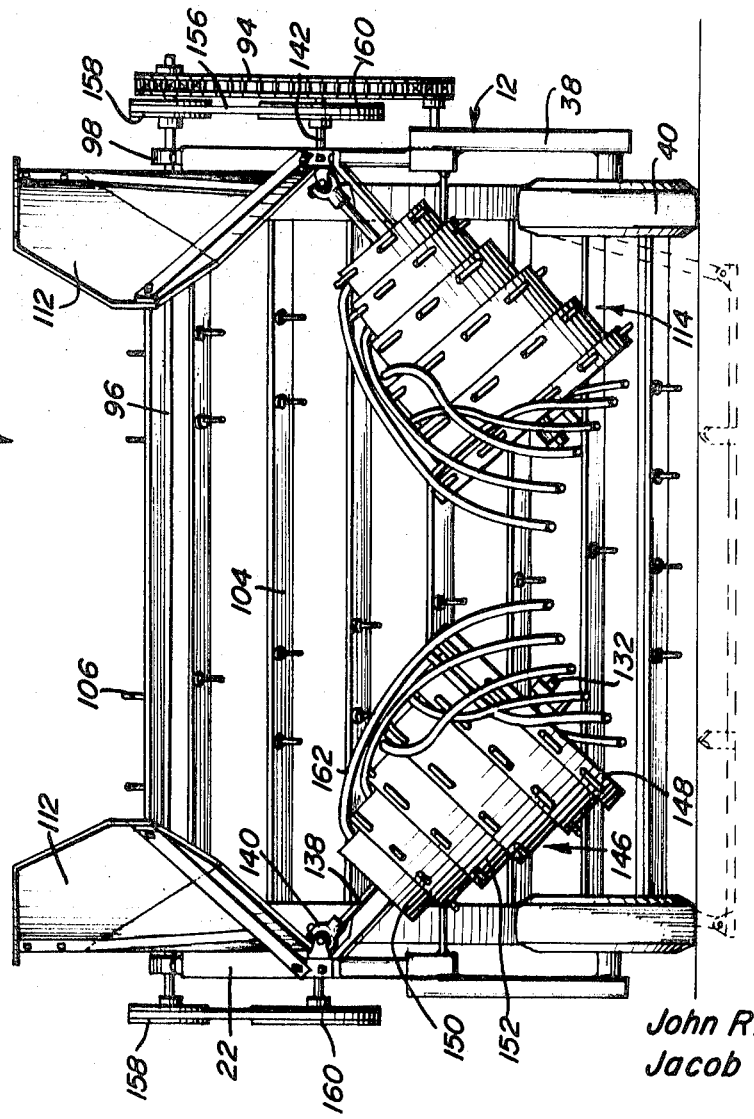
FIG. 3 is a rear elevational view of the harvesting machine.

Referring now to the drawings in detail, the harvesting machine generally denoted by reference numeral 10 in FIGS. 1, 2 and 3 includes a frame assembly generally referred to by reference numeral 12 adapted to be towed forwardly by a tractor vehicle through a hitch assembly 14. The hitch assembly includes a pair of tie rods 16 pivotally interconnected at the forward ends thereof with a pair of bars 18 by means of a connecting bolt assembly 20, to which a tractor coupling is adapted to be secured. The hitch rods 16 diverge from the bolt assembly 20 with the rear ends thereof being pivotally connected to upwardly inclined frame members 22 welded to horizontal side frame members 24 which are interconnected at forward ends by a cross frame member 26. The rear ends of the bars 18 are pivotally connected to the cross frame member 26. The tie rods 16 and bars 18 are interconnected at their forward ends by the pivot bolt assembly 20 with a pair of downwardly diverging hitch bars 28 pivotally connected at their lower ends by pins 30 parallel spaced bars 32 that extend forwardly from a cross frame member 34 interconnecting side frame sections 36 at the forward ends thereof, the side frame sections 36 being secured to the forward end portions of the side frame members 24. Secured as by welding to the side frame members 24 adjacent the rear end thereof are a pair of posts 38 which rotatably mount at the lower ends a pair of supporting wheel assemblies 40. The frame assembly 12 is accordingly supported above the ground by the wheel assemblies 40 and the tractor to which the frame assembly is hitched at its forward end.

Secured to the juncture of the cross frame members 34 and the side frame sections 36, are sleeves 42 within which vertical posts 44 are secured in adjusted positions by means of the setscrews 46. An intermediate post 48 is secured to the cross frame member 34 in a similar fashion. The posts 44 and 48 rotatably mount adjacent their lower ends, colter discs 50 which are adapted to roll and cut the ends of vine-type plants in the middle of a furrow between rows in order to ensure that one row of plants is not entangled with the adjacent one.

Figure 4:
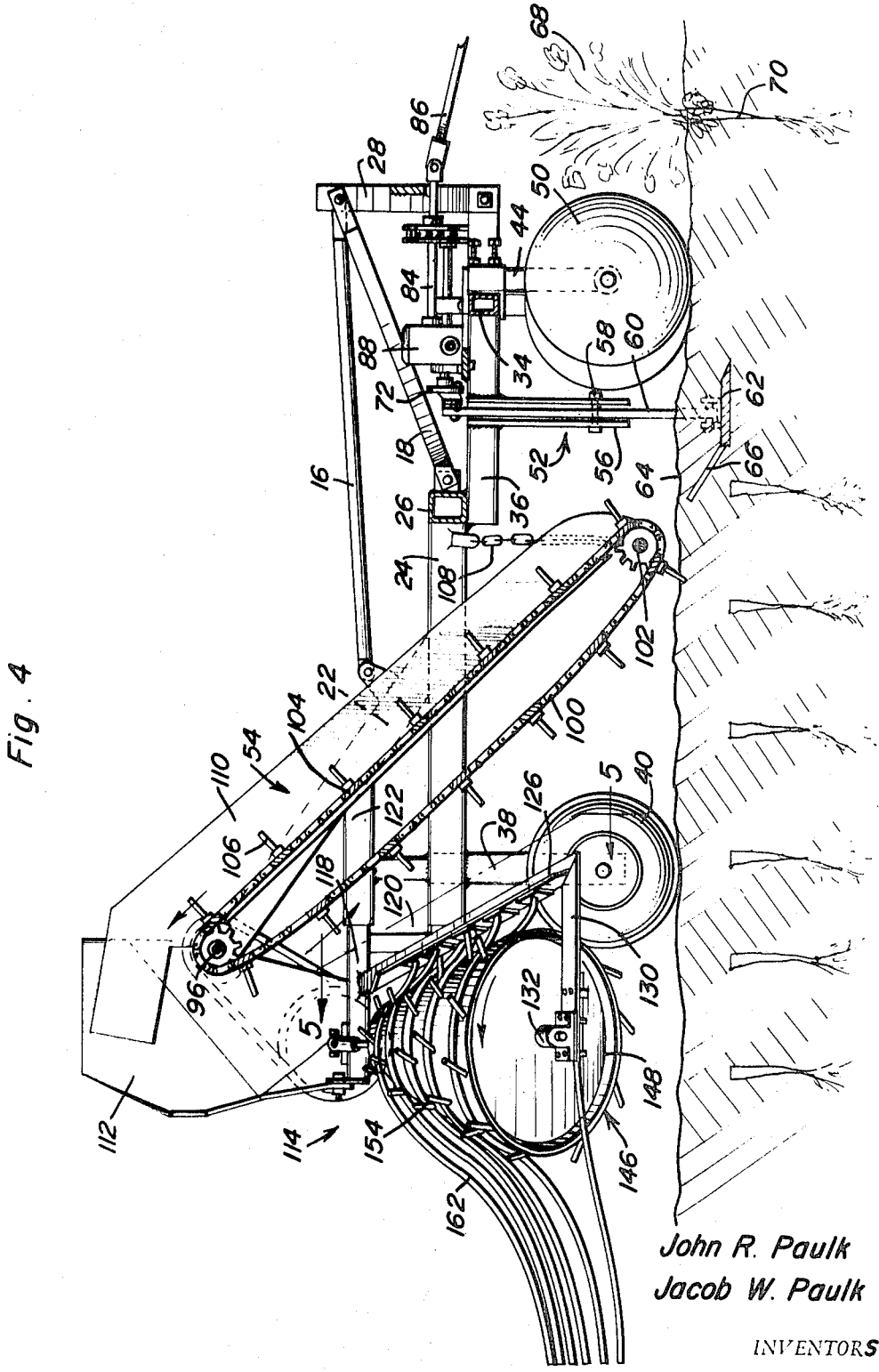
FIG. 4 is a side elevational view through the machine taken substantially through a plane indicated by section line 4—4 of FIG. 1.

The frame assembly also supports in rearward relation to the colter discs 50, a cutter mechanism generally denoted by reference numeral 52 and a conveyor generally referred to by reference numeral 54. As more clearly seen in FIGS. 2, 4 and 7, the cutter mechanism includes downwardly depending brackets 56 secured as by welding to the side frame sections 36 in close rearwardly spaced relation to the colter discs 50 in order to mount pivot bolts 58 on which lever elements 60 are pivotally mounted. The lower end of the lever elements are interconnected with a cutter bar 62 adapted to be disposed below the surface of the soil 64 as shown in FIG. 4. Upwardly inclined lifter bars 66 are secured to the rear edge of the cutter bar 62 in order to guide upward displacement of cut plants 68 severed at the taproots 70 by the cutter bar during forward movement of the harvesting machine. The cutter bar 62 is laterally reciprocated by means of a crank element 72 pivotally connected to the upper ends of the lever elements by means of a connecting rod 74. The crank element is connected to the end of a drive shaft 76 journaled by a bearing assembly 78 secured to the top of a cross frame member 80 interconnecting the forwardly extending frame members 32 to which the hitch bars 28 are connected at their forward ends as shown in FIG. 1. The forward end of the drive shaft 76 is drivingly connected by the sprocket chain 82 to an input shaft 84. The input shaft is driven from a tractor power takeoff through the universal shaft section 86.

In addition to driving the cutter mechanism 52, the input shaft 84 also imparts drive to the conveyor 54. The rear end of the input shaft accordingly extends into a gearbox 88 from which an output shaft 90 extends laterally. Connected to the lateral end of the shaft 90 on one side of the frame assembly 12, is a sprocket gear 92 about which an endless sprocket chain 94 is entrained for transmitting drive to the upper rear end of the conveyor through a drive shaft 96 journaled at the upper ends of the inclined frame members 22 by means of the bearing assemblies 98. Secured to the drive shaft 96 on the inside of the inclined frame members 22, are sprockets wheels about which a pair of laterally spaced sprocket chains 100 are entrained, the lower ends of the sprocket chains being entrained about sprocket gears secured to a shaft 102 as more clearly seen in FIG. 4. The conveyor chains 100 are interconnected by slats 104 from which plant engaging pins 106 project in laterally spaced relationship to each other. Thus, as the drive shaft 96 is rotated in a counterclockwise direction as viewed in FIG. 4, the upper arm of the conveyor 54 moves upwardly from the lower end thereof supported by the shaft 102 positioned by chains 108 suspended from the side frame members 24. The lower inlet end of the conveyor is thereby operatively positioned in close rearwardly spaced relationship to the lifter bars 66 projecting upwardly from the cutter bar 62. Cut plants 68 are accordingly lifted onto the conveyor by engagement with the upwardly moving pins 106 during forward movement of the harvesting machine in order to transport the cut plants to the upper discharge end of the conveyor.

Side shields 110 are fixedly mounted on the frame assembly on the laterally outer sides of the conveyor chains 100 in order to confine the plants to the conveyor. Secured to the upper ends of the shields 110 are deflector shields 112 that extend laterally inwardly in rearwardly spaced relation to the conveyor. The deflecting shields 112 accordingly insure that all the plants discharged from the upper end of the conveyor 54 are received by the plant-inverting assemblies 114 which are mounted at the rear end portion of the harvester frame 12.

Each of the assemblies 114 includes a subframe assembly consisting of a lower horizontal frame member 116 and an upper horizontal frame member 118 as more clearly seen in FIGS. 5 and 6, interconnected by a vertical connecting frame member 120. The upper and lower frame members 116 and 118 are received within the open tubular ends of the side frame member 24 and an upper parallel frame section 122 that is welded to and extends rearwardly from the inclined frame members 22 an more clearly seen in FIG. 4. Thus, the assemblies 114 may be properly positioned in rearwardly spaced relation to the conveyor and welded in place as an attachment to a peanut-harvesting machine.

Referring in particular to FIGS. 4 and 5, each assembly 114 is provided with an angle bar 126 that is attached as by welding at an upper end to the upper horizontal frame member 118 and extends downwardly at a forwardly inclined angle therefrom. A brace bar 128 is interconnected between the lower frame member 116 and the angle bar 126 as shown in FIG. 5 in order to support the angle bar at its inclined position. Secured to the inner and lower end of the angle bar 126, is a horizontal support bar 130 as more clearly seen in FIG. 4 on which a bearing assembly 132 is mounted. The bearing assembly 132 rotatably journals a shaft 134 connected at its laterally outer end by a universal coupling 140 to a shaft 142 journaled by a bearing assembly 144 on the upper frame member 118. The shaft 138 is secured to and supports a stepped diameter type of conical roller generally referred to by reference numeral 146 having a large diameter end 148 disposed adjacent to the bearing assembly 132 and a small diameter end 150 located thereabove along the shaft 138. The shafts 138 associated with the assemblies 114 rotatably mount the associated conical rollers 146 about laterally inclined axes which are generally perpendicular to the direction of movement of the harvester frame or the rows of plants being harvested thereby, as more clearly seen in FIGS. 1 and 3. Also, in view of the conical shape of the rollers 146, the large and smaller diameter ends thereof are approximately equidistant from the underside of the conveyor 54 from which plants are transferred to the assemblies 114. In this fashion, removal of plants from the conveyor is ensured so as to eliminate the problem occurring in prior art harvesting machines wherein plants that cling to the conveyor are returned to the lower end of the conveyor along its underside.

The external stepped diameter portions 152 of the conical rollers 146 are provided with circumferentially spaced plant-engaging pins 154 arranged to pick up and remove the plants from the upper discharge end of the conveyor 54 as the rollers are rotated in a counterclockwise direction as viewed in FIG. 4. The rollers are driven from the drive shaft 96 by means of endless belt drives 156 entrained about pulleys 158 and 160 respectively secured to the drive shaft 96 and the shafts 142 connected by the universal joints 140 to the conical roller shafts 138 adjacent the small diameter ends 150 thereof.

Secured to the angle bars 126 and located in close forwardly spaced relationship to each of the conical roller members 146, are a plurality of parallel spaced guide rods 162. The guide rods curve over the conical roller members as more clearly seen in FIGS. 1 and 4 and then downwardly and rearwardly beyond the conical roller members. Further, as more clearly seen in FIGS. 1 and 3, the guide rods disposed above the smaller diameter end portions of the conical roller members curve laterally inwardly toward the centerline or longitudinal axis of the machine to define spiral guide paths therebetween.

As diagrammatically illustrated in FIG. 8, the plants or band of peanut vines 68 are engaged by the rollers as they are turned over the upper discharge end of the conveyor and are accordingly transferred rearwardly from the conveyor by the pins 154 projecting from the external surface of the conical roller members. The taproots 70 of the plants will project between the guide rods 162, the curvature of which is such as to cooperate with the rotation of the conical roller members and cause the plants to be inverted. Thus, as the plants leave the guide rods, they are deposited in windrows 164 as shown in FIG. 8 with the taproots exposed upwardly for drying by the air. This positive positioning of the plants occurs because the tips of the vines are displaced laterally outwardly by virtue of the inclination of the rollers as shown in FIG. 3 while at the same time the taproot portions thereof are constrained for movement in a rearward direction and in some cases laterally inwardly because of the curvature of the guide rods 162. Further, those vines on the inside of the bands engaged with the larger diameter end portion of the roller members, have a higher linear speed imparted thereto causing them to be displaced laterally outwardly with greater momentum than the higher outside vines of the band as they leave the rollers resulting in a spiral action to completely turn the vines over with the tips of the vines on outer edges of the windrow 164 as shown in FIG. 8. This insures that the taproots remain on top and are exposed to the drying effect of the air.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. In combination with a machine for harvesting vine-type plants growing in a row having means for cutting the roots of the plant below the surface of the soil and conveying means for rearwardly transporting the plants to a discharge location, means for windrowing the plants in inverted positions to expose said roots comprising at least one plant engaging member movably mounted by the machine at said discharge location in rearwardly spaced relation to the conveying means, drive means operatively connected to the plant-engaging member for imparting movement to the plants received from the conveying means along curved paths, inverting guide means mounted by the machine in operative relation to the plant-engaging member for guiding movement of the plants along said curved paths while the plants are engaged with the plant engaging member.

2. The combination of claim 1 wherein said plant engaging member includes a roller rotatably mounted about a laterally inclined axis perpendicular to said row, said roller having an external annular surface portion increasing in peripheral linear speed toward a lower end of the inclined axis when rotated by the drive means.

3. The combination of claim 2 wherein said roller is generally conical in shape.

4. The combination of claim 3 wherein said guide means includes a plurality of parallel spaced root-engaging rods extending rearwardly over and beyond the plant engaging member.

5. The combination of claim 1 wherein said plant-engaging member is a generally conical roller having an upper small diameter end and a lower large diameter end.

6. The combination of claim 5 wherein said guide means includes a plurality of parallel spaced root-engaging rods extending rearwardly over and beyond the plant engaging member.

7. The combination of claim 1 wherein said guide means includes a plurality of parallel spaced root-engaging rods extending along said curved paths rearwardly over and beyond the plant-engaging member.

8. The combination of claim 1 including shield means for deflecting the tips of the plants laterally from the conveying means onto the plant-engaging member.

9. In a harvesting machine having a conveyor extending upwardly and rearwardly to a discharge location from which plants are windrowed, a plant-inverting assembly comprising conical roller means rotatably mounted at said discharge location for inverting plants received from the conveyor, drive means connected to the roller means for rotation thereof to effect said inversion of plants and guide means fixedly mounted by the machine in operative relation to the roller means for guiding movement of the plants to the ground from the roller means.

10. The combination of claim 9 wherein said guide means includes a plurality of parallel spaced root-engaging rods extending rearwardly over and beyond the roller means.

11. The combination of claim 10 wherein said roller means includes at least one generally conical member rotatable about a lateral inclined axis.

12. The combination of claim 9 wherein said roller means includes two generally conical members rotatably mounted about laterally inclined axes and having larger diameter end portions located adjacent each other and remotely spaced smaller diameter end portions disposed above the larger diameter end portions.

13. The combination of claim 12 wherein the larger and smaller diameter end portions of each of said conical members are approximately equidistant from the conveyor.

14. The combination of claim 9 wherein said roller means includes at least one generally conical member rotatable about a lateral inclined axis.

15. The combination of claim 14 wherein the larger and smaller diameter end portions of said conical member are approximately equidistant from the conveyor.

* * * * *